July 31, 1923.
J. A. McLANE
1,463,708
METHOD FOR MAKING REENFORCED INNER TUBES FOR TIRES
Filed June 12, 1920　　2 Sheets-Sheet 1
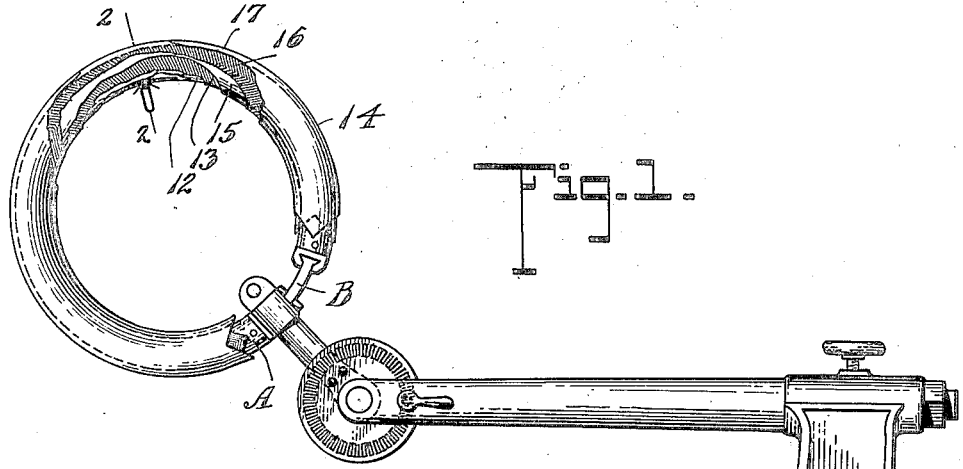
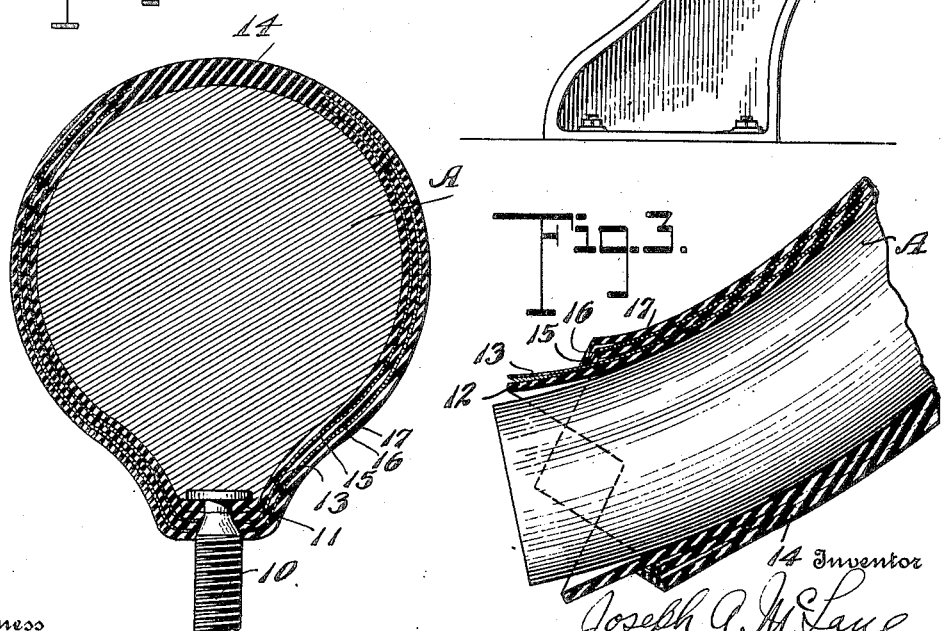
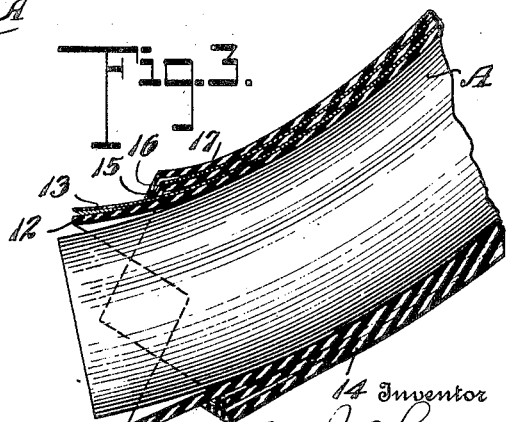
Witness
E. H. Wagner
Inventor
Joseph A. McLane
By Edw. R. Walton Jr.
Attorney

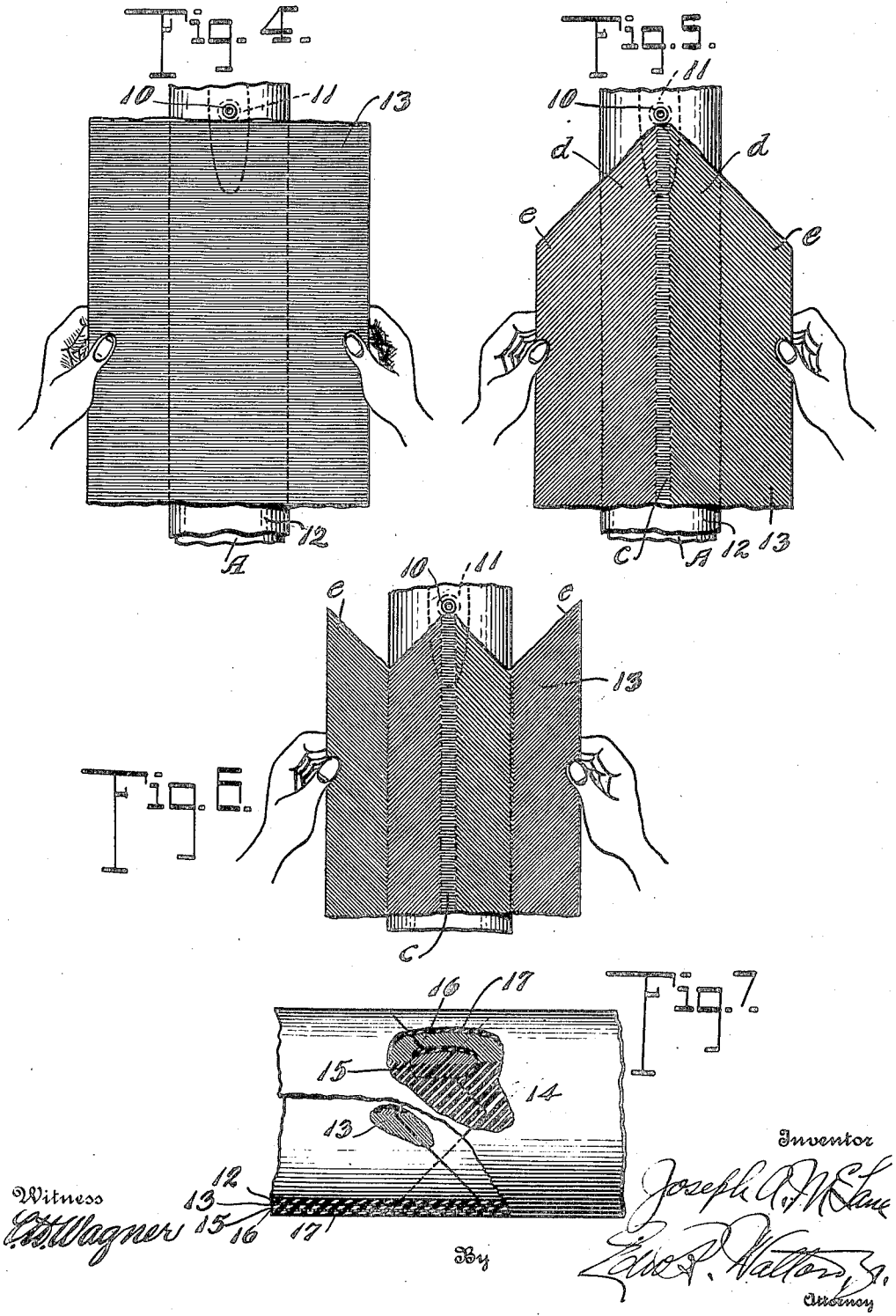

Patented July 31, 1923.

1,463,708

UNITED STATES PATENT OFFICE.

JOSEPH A. McLANE, OF MORGANTOWN, WEST VIRGINIA, ASSIGNOR TO THE ARMOR-CORD RUBBER COMPANY, OF MORGANTOWN, WEST VIRGINIA, A CORPORATION OF WEST VIRGINIA.

METHOD FOR MAKING REENFORCED INNER TUBES FOR TIRES.

Application filed June 12, 1920. Serial No. 388,491.

*To all whom it may concern:*

Be it known that I, JOSEPH A. McLANE, a citizen of the United States, residing at Morgantown, in the county of Monongalia and State of West Virginia, have invented a new and useful Method for Making Reenforced Inner Tubes for Tires, of which the following is a specification.

The present invention relates to a method for the production of inner tubes to be used in connection with pneumatic vehicle tires, and the principal object of the invention is the production of such tubes which shall possess superior reliability and durability, coupled with the necessary expansive and yielding qualities necessary for such tubes.

While this improved method is almost exclusively employed in the manufacture of inner tubes for pneumatic tires, it is to be understood that the method may be employed in the manufacture of single tube tires. Furthermore, while the present method is employed in the manufacture of inner tubes, such as covered by application Serial No. 379,561, filed May 7, 1920, which covers the tube as an article of manufacture, the method may be employed in connection with tubes of different construction, that fall within the scope of the appended claims.

The method consists primarily in constructing a tire tube having embedded in the walls thereof a series of parallel weftless cords laid closely one to the other and extending from one side of an outer circumferential zone, directly beneath the tread of the casing, around the tube and terminating at the opposite side of said zone portion. This series of cords is arranged to extend from the rim side of the tube and, preferably, diagonally about the tube, whereby the tube is reenforced especially along its sides to protect the tire casing at the point where it is most needed and weakest and subject to constant deformation and strain, while at the same time securing resiliency and expansion. This resiliency and expansion is obtained by reason of the freely expanding zone protected by the heavy tread of the casing, the freely separating ends of the cords, their yielding anchorage in the rubber of the outer zone, and their tendency to yield under depression or inflation as the result of their free diagonal arrangement assisting materially in aiding expansion of the tube as a whole, and making it possible to reenforce in the required degree.

The method resides in the several steps set forth in the specification and appended claims.

Reference should be had to the accompanying drawings, in which—

Figure 1 is an elevation of a mandrel showing tube thereon fabricated according to the present method, the tube being broken away at portions to illustrate its construction.

Fig. 2 is a view taken on line 2—2 in Fig. 1.

Fig. 3 is an enlarged fragmentary view of one end of the mandrel, illustrating the formation of the ends of the tube before the ends are united.

Fig. 4 is a fragmentary detail view illustrating the first step in laying or applying the corded sheets about the mandrel in the building of the tube.

Fig. 5 illustrates the next step in applying the corded sheets after being applied in the manner shown in Fig. 4.

Fig. 6 illustrates the manner in which the corded sheets are deformed subsequent to the step shown in Fig. 5, and Fig. 7 is a fragmentary detail view illustrating the joined ends of the tube and the manner in which the edges overlap or splice.

In practice a circular mandrel is preferably used to give the proper shape and contour to the tube so that it may properly fit tire casings with which it is to be used, and further, so there will not be surplusage of stock on the inner periphery which will fold or buckle when disposed in the casings.

The mandrel A is, preferably, in the form of a split ring, or else provided with a removable section, such as B, in order that the tube may be removed therefrom.

In building the tubes, a valve stem 10, assembled as usual with a valve patch 11, is first located upon an inner side of the circular mandrel or forming core, preferably at a point opposite the removable section B of the mandrel. This is followed by a layer or coating of soft rubber 12, applied in the usual manner and forms the inner face of the tube, the same uniting firmly with the patch by adhesion of the uncured rubber surfaces.

After the inner rubber layer is laid, the first layer of weftless cord is next applied. In order to make this application of the cords with uniformity and with sufficient insulation one from the other, the cords are first laid in straight, transverse, parallel arrangement in rubber-cement, or in a sheet of rubber in an uncured pasty condition, but of a consistency sufficient to be capable of handling in sheet form, as shown in Figures 4, 5 and 6. This corded sheet is, preferably, of a length one-half the circumference of the tube being built, and of a width less than the cross-sectional circumference thereof, and is laid with one end adjacent valve and the cords thereof extending transversely of the tube, with its medial line $c$ substantially coinciding with a medial line of the inner or rim side of the tube, as indicated in Fig. 4. This corded sheet is caused to stick or adhere to the first layer of rubber 12 by running a roller or other similar implement longitudinally of the said medial line of the rim side of the tube, the adhesion resulting, as is understood, on account of the uncured condition of the rubber stock.

The corded sheet 13 is then deformed by pulling or stretching the free side portions thereof in an endwise direction, causing it to assume the form of a V, as shown in Fig. 5. As this pulling or distortion of the sheet takes place, the same is brought in contact with and adheres around a portion of the tube, as at $d$, and the remaining free marginal portions $e$ are then, preferably, subjected to deformation or stretching in the opposite direction to produce an angle in the cords at each side of tube, as shown in Fig. 6, these marginal portions $e$ likewise being brought to adhere to the rubber layer beneath it. It will be observed that the side edges of the corded sheet, as applied in building up the tube, do not meet about the tube but leave a circumferential zone 14 free of cords. The cords, by terminating at this zone on opposite sides thereof, permit more ready separation of the cords under strain and their yielding lengthwise, by reason of the yielding anchorage given them, while their zigzag or triple V arrangement provides for freer adjustment and distribution of strain, especially in a transverse direction, with the purpose of rendering the tube as pliable and resilient as possible in view of the degree of reinforcement obtained in the reenforced portion. And by arranging the middle bend of the cord on the medial line $c$ of the rim portion of the tube, the natural construction of the tube along this line under inflation permits the cords to give outwardly with the cross expansion of the tube; while the two outer bends, formed by the portion $d$ of the corded sheet 13, occur on the sides of the tube where it is subjected most to the constant bending strain and deformation due to the tendency of the tube to flatten out under the weight sustained by it, which requires at these points the cords to yield with the rubber of the tube walls and not too greatly restrain, as would result were the cords extended in one direction on each side of the tube. It is found that if the corded layer be too unyielding, separation from the rubber occurs, as well as undue heating. To complete the first corded layer of the tube, another corded sheet of a length, preferably, one-half of the circumference of the tube, is applied in the same manner as above described, on the other side of the valve-stem, as shown in Fig. 1. It may, however, be found desirable in some instances to apply the corded layer 13 in one sheet, rather than in two-half sheets, as just described.

Next, a cushion or intermediate sheet or layer 15 of soft rubber is applied over the first corded layer, and, preferably, transversely around the entire tube. Following the cushion strip 15 is applied a second corded layer, preferably, in exactly the same manner as the first corded layer 13, but it will be seen that the sheet 16 is deformed or pulled oppositely to the manner in which the sheet 13 was pulled or stretched, so that the cords of the sheet 16 will cross the cords of the sheet 13. This second corded sheet 16 adds greatly to the reinforcement and stiffening of the tube wall, as stated above, and sufficient yielding is provided by the bending of the cords back and forth along the three circumferential lines indicated, thus making ample reinforcement possible without destroying in too great degree the freedom of the tube in the reenforced portion. This freedom of adjustment, expansion and contraction is present to such extent as to complement the freely expanding zone 14 and give to the tube as a whole exceptional expansive qualities, considering the degree of reinforcement present.

It should be further understood that it is the purpose of the cushion sheet 15 to space the corded layers 13 and 16 well apart by very yielding rubber, whereby the tube walls are more readily distortable, as the cords in each layer have slight movement therein independent of the other. Also, in conjunction with the cords of each corded sheet, being rubber-insulated one from the other, the cushion sheet 15 further insures that under no conditions of use will the cords get together and chafe. In some cases, the cushion strip 15 may be provided by increasing the thickness of the rubber stock of the corded sheets or layers 13 and 16 on their opposing surfaces, of course, having the stock of such consistency or quality as to provide the cushion strip of the textual quality desired, and thereby entirely eliminating friction and chafing between the corded layers.

After the second corded layer 16, the outer rubber layer 17 is applied in substantially the same manner as the inner rubber layer 12, in order to envelop the entire tube and the tube is completed by next splicing the ends together, after removing it from the mandrel A.

It will be observed from Figures 1 and 3, that the ends of the tube are scarfed due to the zigzag arrangement of the cords. The end edges of each corded layer 13 and 16 are scarfed in alternation at each end of the tube by virtue of the cords in each layer being laid in opposite directions.

In uniting or splicing the ends of the fabricated tube, however, it is found preferable to cut the end edges of the inner rubber layer or sheet 12 to correspond with the first corded layer 13, and to cut the outer rubber sheet or layer 17 to correspond with the scarfed edges of the second corded layer 16. In cases where the cushion strip 15 is separate and independent of the corded layers 13 and 16, the end edges of this layer may be trimmed or cut to correspond with the scarfed edges of either of the two corded layers. These scarfed edges of the tube ends are then brought together, preferably to abutting relation as shown in Fig. 7. Thus, the projecting portions of the edges of one layer will fit into corresponding gaps in the other edge of the same layer, and the projecting portion of each layer at one end of the tube will overlap similar projections of the other layer at the other end of the tube. By this joint, the same uniformity of reinforcement of the cords is carried out because the exact formation or outline of the reinforcing cords of each corded layer is followed. Of course, the joint or splice may be made by slightly overlapping the scarfed edges rather than abutting the same in the manner stated.

The tube is finally placed in a mold and cured in the usual manner by vulcanization, where the layers become fused together in a homogeneous mass, although retaining their textual identity in strata form.

Having thus described the present method, what is claimed is:

1. A method of fabricating tire tubes, including applying about a mandrel a sheet of rubber having substantially parallel cords embedded therein, by arranging said sheet to have the cords therein extend substantially transversely from one side of the tread zone, about the rim portion and terminating at the opposite side of the tread zone, and in applying a layer of material about the mandrel to complete the tube.

2. A method of fabricating tire tubes, including applying about a mandrel a sheet of rubber having substantially parallel cords embedded therein, by arranging said sheet to have the cords therein extend substantially transversely from one side of the tread zone, about the rim portion and terminating at the opposite side of said tread zone; next in applying over said first corded sheet a second rubber sheet having substantially parallel cords embedded therein, and in arranging said second sheet in the same manner as stated in connection with said first corded sheet; and finally in applying an outer cover layer of rubber.

3. A method of fabricating tire tubes, including applying about the mandrel a sheet of rubber having substantially parallel cords embedded therein, by arranging said sheet to have the cords therein extend substantially transversely of the tube, and then deforming the sheet on each side of substantially the medial line of the rim portion of the tube so that the cords therein will lie diagonally to said medial line, and in terminating the cords of the sheet at opposite sides of the tread zone of the tube and in applying a layer of material about the mandrel to complete the tube.

4. A method of fabricating tire tubes, including applying about a mandrel a sheet of rubber having substantially parallel cords embedded therein, by arranging said sheet to have the cords therein extend substantially transversely of the tube, and then deforming the sheet on each side of substantially the medial line of the rim portion of the tube so that the cords therein will lie diagonally to said medial line, and in terminating the cords of the sheet at opposite sides of the tread zone of the tube; next in applying over said first corded sheet a second sheet of rubber having substantially parallel cords embedded therein, and in arranging said second sheet in the same manner as stated in connection with said corded sheet; and finally in applying an outer cover layer of rubber.

5. A method of fabricating tire tubes, including applying a layer of rubber stock around a mandrel to provide the inner face of the tube; then in applying a sheet of cords on said inner layer and arranging said sheet to have the cords thereof extend substantially transversely from one side of the tread zone, about the rim portion and terminating at the opposite side of the tread zone of the tube; next, in applying another layer of rubber over said corded sheet; then supplying a second sheet of cords in the manner stated in connection with said first corded sheet; and finally in applying an outer cover layer of rubber.

6. A method of fabricating tire tubes, including applying a layer of rubber stock around a mandrel to provide the inner face of the tube; then applying a rubber sheet having substantially parallel cords embedded therein, by attaching said sheet to substantially the medial line of the rim portion of the inner layer, and then deforming the sheet so that the cords therein will lie diagonally to said medial line; in next applying a second corded sheet of rubber over said first corded sheet, and arranging said second corded sheet in the same manner as stated in connection with said first corded layer; and in finally applying an outer cover layer of rubber.

7. A method of fabricating tire tubes, including applying a layer of rubber stock around a mandrel to provide the inner face of the tube; then applying a sheet of rubber having substantially parallel cords embedded therein, by attaching said sheet to substantially the medial line of the rim portion of said inner layer, and then deforming said sheet so that the cords therein will lie diagonally to said medial line; and next applying a second corded rubber sheet over said first corded sheet, and in arranging said second corded sheet in the manner stated in connection with said first corded layer, but deforming the sheet so that the cords thereof extend at opposite angles to the cords of the first sheet; and in finally applying an outer cover layer of rubber.

8. A method of fabricating tire tubes, consisting in applying a layer of rubber stock around a mandrel to provide the inner face of the tube; then applying a sheet of transverse cords on said inner layer at substantially the medial line of the rim section of the tube, and then deforming the sheet so that its cords will form substantially a V with is apex lying on said medial line of the rim section, and terminating the side edges of said corded sheet at each side of the tread section of the tube to provide a tread zone free of cords; next, in applying a cushion layer of rubber over said corded sheet; then in applying a second sheet of transverse cords on the cushion layer in the manner stated in connection with said first layer of cords, but deforming the cords in opposite direction to the cords of said first corded layer; then in applying an outer cover of rubber; and finally in splicing the ends of the tube, when removed from the mandrel.

9. A method for making tire tubes, consisting in applying a layer of rubber stock around a mandrel to provide the inner face of the tube; then applying a sheet of transverse cords on said rubber layer to substantially the medial line of the rim portion of the tube and then pulling the sides of the sheet lengthwise of the mandrel to substantially V form and securing portions of the cords nearer the apex of the V to said inner rubber layer, and then subsequently pulling the side marginal portions of the corded sheet lengthwise in the opposite direction and securing said marginal portions to the inner rubber layer to form substantially V angles on each side of the tube, and terminating said marginal portion at each side of the tread portion of the tube to provide a tread zone free of cords; in next applying a cushion layer of rubber over said corded sheet; thence applying a second sheet of transverse cords on the cushion layer in the manner stated in connection with said first corded layer but deforming the cords in opposite directions to the cords of said first corded layer; and finally in applying an outer rubber layer enveloping the whole mandrel and forming the outer face of the tube.

10. A method for making tire tubes consisting in applying a layer of rubber stock around a mandrel to provide the inner face of the tube; then attaching a sheet of transverse cords on said rubber layer at substantially the medial line of the rim portion of the tube, and terminating the side edges of said corded sheet at each side of the tread portion of the tube to provide a tread zone free of cords; then applying a second sheet of transverse cords in the manner stated in connection with said first corded layer; and finally in applying an outer cover layer of rubber.

11. A method of fabricating tire tubes, consisting in applying a layer of rubber stock about a mandrel to provide the inner face of the tube; then applying a sheet of substantially parallel cords incorporated in a rubber material, by arranging said sheet so that the cords thereof extend substantially transversely of said inner layer and attaching it to the latter at substantially the medial line of the rim portion of the tube, and then deforming the sheet about the mandrel so that the cords thereof will lie diagonally to said medial line, securing the portions of said sheet nearer the medial line to said inner layer, and then subsequently deforming the unsecured portions of said sheet so that the cords therein will lie in opposite diagonal directions to said first deformation and securing it to the inner layer; and in finally applying an outer rubber cover.

12. A method of fabricating tire tubes, consisting in applying a sheet of rubber about a mandrel to provide the inner face of the tube; then applying a sheet of substantially parallel cords incorporated in rubber material, by arranging said sheet so that the cords thereof extend substantially transversely of said inner layer and attaching it to the latter at substantially the medial line of the rim portion of the tube, and then deforming the sheet about the mandrel so that the cords thereof will lie diagonally to said medial line, securing the portions of said sheet nearer the medial line to said inner layer, and then subsequently deforming the unsecured portions of the sheet so that the cords therein will lie in opposite diagonal directions to said first deformation and securing it to the inner layer; then applying a second sheet of substantially parallel cords incorporated in rubber material by arranging said sheet in the same manner stated in connection with said first corded sheet, but deforming the cords thereof in directions opposite to the deformation of the cords of said first corded sheet; and finally in applying an outer cover of rubber.

13. A method of fabricating tire tubes, which consists in first forming a sheet of rubber having substantially parallel cords embedded therein, then applying said sheet about a forming mandrel by securing the same along a circumferential line with the cords extending transversely thereto, then deforming said sheet on each side of the line of said securing, to cause the cords to lie diagonally to said line, then affixing said deformed portion to retain the deformation, and then joining the ends of the sheet.

14. The method of fabricating tire tubes, which consists in first forming a tube, then applying to the tube a layer of rubber having parallel cords imbedded therein and arranging said corded layer so as to position the cords therein in a series of slants crosswise of the tube, applying a second like layer of corded rubber over said first corded layer arranged to cause like portions of the cords of one layer to cross those of the other layer, then joining the ends of the tube by forming the ends of each corded layer to follow the slanting, back and forth line of the cords thereof, and abutting the ends of like layers and overlapping the projecting portions of the ends of one layer with the similar portion at the opposite end of the other layer, as and for the purpose set forth.

In testimony whereof I have hereunto set my hand.

JOSEPH A. McLANE.